BEST AVAILABLE COPY

541

H. Sawyer,

Powder Package,

No. 2,769, Reissued Oct. 1, 1867.

Witnesses;
F. Fowler
W. B. Crosby

Inventor;
Henry Sawyer

BEST AVAILABLE COPY

United States Patent Office.

HENRY SAWYER, OF ROXBURY, MASSACHUSETTS.

*Letters Patent No.* 41,097, *dated January* 5, 1864; *reissue No.* 2,769, *dated October* 1, 1867.

IMPROVEMENT IN PUTTING UP POWDERS, &c.

The Schedule referred to in these Letters Patent and making part of the same.

TO ALL TO WHOM THESE PRESENTS SHALL COME:

Be it known that I, HENRY SAWYER, of Roxbury, in the county of Norfolk, and State of Massachusetts, have invented a new and useful Improvement in Packing Powders and Fluids for transportation and use; and I do hereby declare the following to be a full, clear, and exact description of the same, due reference being had to drawings accompanying and making part of this specification, and in which—

Figure 1:
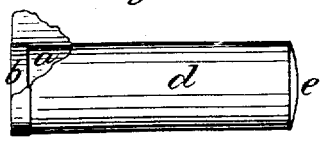

Figure 1 denotes a side elevation.

Figure 2:
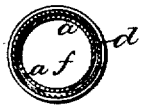

Figure 2, a central and longitudinal section, and

Figure 3:
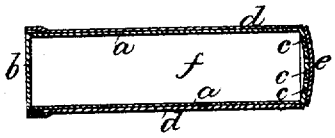

Figure 3 a cross-section of the said invention.

The purpose of my invention is the packing of fine or impalpable powders, for household or other use, in such manner that the cases in which they are contained shall serve alike for the convenient transportation, sale, and distribution, for consumption or use, of the powders; and the invention consists in the manner of constructing the package, substantially as hereinafter described.

In the drawings, above referred to, *a* denotes a long cylindrical box, provided at one end with a cover, *b*, and the opposite with delivery holes *c c*. A descriptive or enveloping paper, *d*, surrounds and is pasted upon the sides of the cylinder, one end or edge of the paper extending over the edge or lid of the cover *b*, so as to confine or fasten it upon the box. Over the delivery holes *d d* a seal or wafer, *e*, of wax, gluten, paper, or other suitable or analogous material or substance is cemented, so as to close the holes and prevent the escape of the contents of the box during transportation, or when packed or exposed for sale.

When wanted for use it is only necessary to break off the cement or seal *e*, and without any manipulation or unpacking of the powder it can be sprinkled or distributed as may be desirable.

I would remark that instead of a cover at one end of the case, and the delivery holes at the opposite end, the cover itself may be perforated and answer both the purposes.

I find my invention particularly useful for the package, transportation, and consumption of the powder called "blueing," much employed for domestic use, in washing or cleansing clothes, to prevent their turning yellow. The powder is inconvenient to handle, and hence it has been a desideratum to pack it at the place where manufactured, or put up in such manner that it might not only be transported and sold for use in the original package, but it might also be distributed or sprinkled from the said case or package without handling. My invention, as will be readily understood, accomplishes this purpose; the paper envelope keeping the powder from escaping by the edges of the cover, and the distributing end of the box being kept sealed till the powder is wanted, as described.

The invention is very useful in packing all kinds of powders which are consumed in small quantities, either domestically or in the arts, and which are inconvenient, unpleasant, or dangerous to handle. It may also, to some extent, be employed for packing fluids to be used in the same manner.

What I claim as a new article of manufacture, is—

A package or case, which, when made with distributing holes and filled, is cemented by the wax or wafer *e*, as set forth.

HENRY SAWYER.

Witnesses:

FREDERICK CURTIS,

E. C. GRIFFITH.